United States Patent [19]

Charransol et al.

[11] 3,832,492

[45] Aug. 27, 1974

[54] PCM SWITCHING NETWORK PROVIDING INTERLEAVING OF OUTGOING AND INCOMING SAMPLES TO A STORE DURING EACH TIME SLOT

[75] Inventors: Pierre Charransol; Jacques Hauri, both of Paris; Claude Athenes, Montreuil, all of France

[73] Assignee: International Standard Electric Corporation, New York, N.Y.

[22] Filed: Mar. 17, 1972

[21] Appl. No.: 235,828

[30] Foreign Application Priority Data

Mar. 18, 1971 France .............................. 71.09494

[52] U.S. Cl. ......................... 179/15 AT, 179/15 AQ

[51] Int. Cl. ............................................... H04j 3/00

[58] Field of Search ...... 179/15 AQ, 18 GF, 15 AT, 179/15 BV, 18 ES

[56] References Cited

UNITED STATES PATENTS

| | | | |
|---|---|---|---|
| 2,458,659 | 7/1969 | Sternung | 324/123 |
| 3,573,381 | 4/1971 | Marcus | 179/15 |
| 3,597,548 | 8/1971 | Drinnan | 179/15 AT |
| 3,674,938 | 7/1972 | Jacob | 179/15 |
| 3,694,580 | 9/1972 | Inose | 179/15 |
| 3,736,381 | 5/1973 | Johnson | 179/15 AT |

FOREIGN PATENTS OR APPLICATIONS

| | | | |
|---|---|---|---|
| 1,181,913 | 2/1970 | Great Britain | 179/15 AQ |

*Primary Examiner*—Kathleen H. Claffy
*Assistant Examiner*—Thomas D'Amico
*Attorney, Agent, or Firm*—J. B. Raden; D. P. Warner

[57] ABSTRACT

In a space-time-space switching network an interleaving technique is used to enable increased time (doubling) for read and write operations. The system is realized by adding input and output registers to an exemplary system and adding controls for the registers. The addition of the registers and controls specifically enables a coded sample from subscriber A to be read out in the speech store during a first cycle, a coded sample from subscriber B to be read out in the same store in the next cycle and to be transmitted through the network during the next cycle.

5 Claims, 9 Drawing Figures

PCM SWITCHING NETWORK PROVIDING INTERLEAVING OF OUTGOING AND INCOMING SAMPLES TO A STORE DURING EACH TIME SLOT

BACKGROUND OF THE INVENTION

1. Field of the Invention

The present invention concerns a coded signal switching network. It has particular application in telephone exchanges applying time division switching to pulse code modulation signals.

2. Description of the Prior Art

At the input of such an exchange, the signals from the lines are sampled at 8 kHz and each sample is converted into a 8-bit coded signal pattern. Each 8-bit combination is transmitted on 8 conductors, in a very short time interval (time slot) from a time channel. It is thus possible to multiplex 256 channels, for example. The recurring period of the successive time slots of a same time channel is 125 μs, whereas the duration of each time slot is approximately 500 ns. An incoming multiplex group thus routes the signals originated from 256 lines. A similar outgoing multiplex group routes the signals towards the same 256 lines. The above-mentioned numerical values, without being necessary, are nevertheless currently admitted.

Inside the exchange, it is necessary that a coded signal combination appearing in a time slot of a multiplex group be retransmitted in any time slot of any multiplex group. This entails space switching operations (connections from group to group) and time switching operations (connections from channel to channel). They will be carried out by means of a network including space switches and stores. This network may be, for example, of the well-known space-time-space type.

A connection path between an incoming channel of a first line (A) and an outgoing channel of a second line (B) uses two space switches arranged, in a way, on each side of a memory cell; they give it access, one to the incoming multiplex groups, the other to the outgoing multiplex groups. In this way, at the time slot assigned to the incoming channel and through the first switch orientated onto the appropriate incoming multiplex group, a coded sample originated from the incoming channel is stored in the memory cell. At the time slot assigned to the outgoing channel and through the second switch orientated onto the appropriate outgoing multiplex group, the coded sample originated from the incoming channel and kept in the memory cell is retransmitted on the outgoing channel. The connection in the opposite direction between the outgoing channel of the first line (A) and the incoming channel of the second line (B) is carried out in the same way and uses generally the same memory cell.

More precisely, at the time slot proper to the outgoing channel of the second line (B), when the coded sample is retransmitted, the memory cell becomes free. Assuming that the incoming and outgoing multiplex groups are in synchronism, this channel time slot is also that of the incoming channel of the same line (B). Consequently, it is thus possible to record, in the considered memory cell, the coded sample supplied at the same instant by the incoming channel of this line (B). The coded sample, thus stored in lieu of that just retransmitted will be kept in the memory cell until the time slot proper to the first line (A) when the same transfer process takes place.

In practice, the numerous and necessary memory cells are memory cells belonging to several speech stores and two space switches are associated with each store. In a speech store, it is necessary to accede twice to each memory cell in a 125 μs cycle, the first time at the time slot assigned to one of the lines and the second time at the time slot assigned to the other line. Each time, both space switches are orientated onto the appropriate incoming and outgoing groups.

In such an exchange, the time factor raises a critical problem. Indeed, if one refers to the preceding description, in a channel time slot of about 500 ns, it is necessary to:

accede to a memory cell and read out the coded sample stored therein;

orientate a first space switch onto an outgoing group;

transmit the coded sample on the outgoing group;

orientate the second space switch onto the incoming group;

receive the coded sample present on the incoming group;

accede to the above memory cell and write the received coded sample therein.

Even, by using the present available faster electronic components, it would be difficult and, in all respects, costly to carry out these operations in such a short time.

SUMMARY OF THE INVENTION

The object of the present invention is thus to provide a coded signal switching network in which the switching operations are arranged in order to use efficiently the available time which enables both increasing speed and reducing costs in a coded signal switching system.

This network is characterized in that it includes, besides the above-mentioned means, a read address source which supplies the speech store with the address of a memory cell which must be read at each channel time slot, an outgoing group address source which supplies the outgoing switch with an outgoing group address for sending a coded combination per channel time slot, an incoming group address source which supplies the incoming switch with an incoming group address for receiving a coded combination per channel time slot, as well as a write address source which supplies the speech store with the address of a cell wherein must be written a coded combination per channel time slot.

The synchronism between these various address sources is such that, for a given call, the coded combination read-out in the concerned memory cell, during a first channel time slot, is transmitted on the appropriate outgoing group, during a second time slot subsequent to the first one; it is replaced by the coded combination originated from the concerned incoming group and transmitted to the store during a third channel time slot in order to be stored in the memory cell, during a fourth channel time slot, subsequent both to the third and the first channel time slots, which respects the above-described switching process while enabling an efficient use of the switches and the store and, accordingly, a high-speed time switching rate.

According to a preferred embodiment of the invention, the second channel time slot, for transmitting a coded combination on an outgoing group, and the third channel time slot, for receiving a coded combination from an incoming group, are one same channel time slot, the incoming and outgoing groups having an appropriate sychronism. Moreover, to each incoming group, for transmission in one direction, there corresponds an outgoing group, for transmission in the other direction. Both groups have the same address, so that the incoming and outgoing group address sources coincide. There is thus obtained an economical arrangement.

BRIEF DESCRIPTION OF THE DRAWINGS

Various further features will be disclosed from the following description which is given by way of non-limited example and with reference to the accompanying drawings which represent.

DESCRIPTION OF PREFERRED EMBODIMENTS

Figure 1:
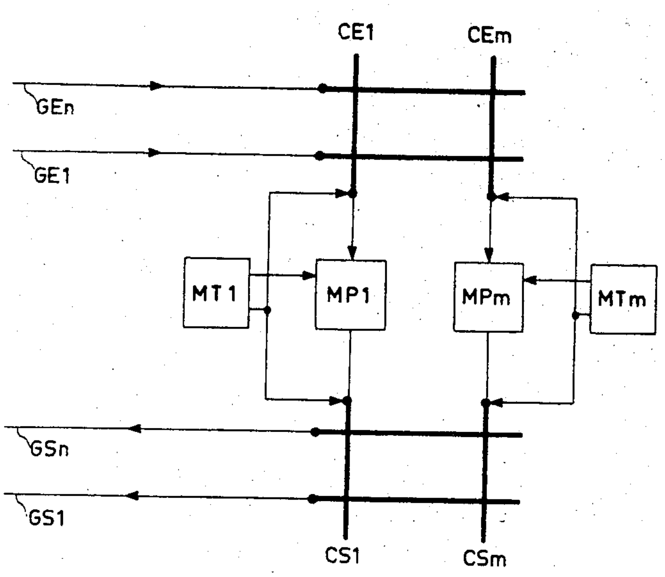
FIG. 1, the block diagram of the circuits of a well known time division switching system in which may be applied the present invention.

Referring to FIG. 1, there will be first described the block diagram of the circuits of a switching network in which may be applied the present invention.

This network includes incoming multiplex groups GE1 to GE*n*. To each of them corresponds an outgoing multiplex group GS1 to GS*n*. These multiplex groups have, for example, 256 channels each having a channel time slot duration of about 500 ns. These channel time slots will be referenced *t*0 to *t*255. The recurring period of the channel time slots is 125 μs. It will also be considered that the multiplex groups are synchronous, that is that the channel time slots *t*0 to *t*255 occur simultaneously in all the groups.

For call connections, there are provided several switching units. The first one includes a path store MT1, a speech store MP1, an incoming group switch CE1 and an outgoing group switch CS1. There has also been represented a switching unit of rank *m* including memories MT*m*, MP*m*, as well as switches CE*m* and CSm.

The path store MT1 is a store having 256 cells cyclically read out in synchronism with the multiplex group channel time slots. Each cell may contain an address of a cell of the speech store and a multiplex group number.

The speech store MP1 may have up to 128 memory cells which will be each assigned to a call. These memory cells are addressed according to connection data supplied by the path memory MT1.

The switch CE1 associates the input of store MP1 with any of the incoming groups, according to connection data supplied by one cell of the path store.

The switch CS1 associates the output of store MP1 with any outgoing group. It will be further seen that it always orientates in the same position as the switch CE1.

The operation of this network will be described referring also to FIG. 2 and considering the case of a call between a subscriber (A) to which corresponds the channel time slot *t*0 on the incoming and outgoing groups GE1 and GS1, and another subscriber (B) to which corresponds the channel time slot *t*78 on the incoming and outgoing groups GE*n* and GS*n*.

Figure 2:
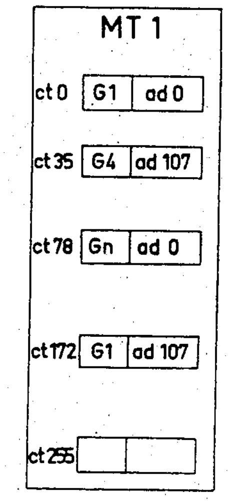
FIG. 2, an example of the information stored in the path store MT1 of FIG. 1.

FIG. 2 illustrates the contents of the path memory MT1. Each memory call *ct*0 to *ct*255 is represented by a rectangle. Inside each rectangle, there has been indicated a multiplex group number (incoming and outgoing) G1, G4, etc., as well as an address of one cell of the speech store *ad*0, *ad*107, etc. The memory cells *ct*0 to *ct*255 are cyclically read out, at the channel time slots *t*0 to *t*255.

These connection data are written into memory MT1, by a non-represented central control unit, according to the calls to be established, in a way which will not be described since it is beyond the scope of the invention.

At channel time slot *t*0, the path store cell *ct*0 supplies the group number G1 and the address *ad*0. The group number G1 is transmitted to switches CE1 and CS1, in parallel. In response, the latter respectively orientate onto groups GE1 and GS1.

Simultaneously, the address *ad*0 is transmitted to the speech store MP1. In the latter, the memory cell corresponding to this address is successively the subject of read and write operations.

Information read out at the address *ad*0 is transmitted on the multiplex group GS1, through switch CS1. Then, information present on the multiplex group GE1, transmitted through switch CE1 to the input of the speech store MP1, is recorded in lieu of that just read out, at the address *ad*0. Subscriber (A) has thus received a coded sample, while the one he supplied has just been recorded.

At the channel time slot *t*78, the path store cell *ct*78 supplies the group number G*n* and again the address *ad*0. Switches CS1 and CE1 are accordingly orientated onto groups GSn and GEn. The address *ad*0 is transmitted to the speech store MP1.

Information read out at the address ad0 is transmitted on the outgoing multiplex group GS*n*, through switch GS1. Then, information present on the incoming multiplex group GE*n*, transmitted through switch CE1 to store MP1, is recorded at the address *ad*0. Subscriber (B) thus receives the coded sample previously received from subscriber (A) and recorded at time slot *t*0. The coded sample he supplies has just been recorded at the address *ad*0, in order to be kept until the next channel time slot *t*0 when it is transmitted to subscriber (A).

It can thus be seen finally that the considered call, between two subscribers to which correspond different channel time slots and multiplex groups, necessitates the two cells of the path store corresponding to these channel time slots in the path store, one memory cell in the speech store and the use of switches CS1 and CE1, at the appropriate channel time slots, in order to reach any multiplex group. If both subscribers are assigned to a same group (incoming and outgoing), the operation is the same. On the contrary, in the case when the subscribers occupy the same channel time slot, in different groups, it is necessary to use a switching unit (non-represented) of a particular type which will not be described since it is beyond the scope of the invention.

The same switching unit may establish up to 128 calls (one for two channel time slots), but it will be noted that the channel time slots must be each time different from those already used. That is why other identical switching units are provided, such as unit MT*m*, MP*m*, CE*m*, CS*m*.

Figure 3:
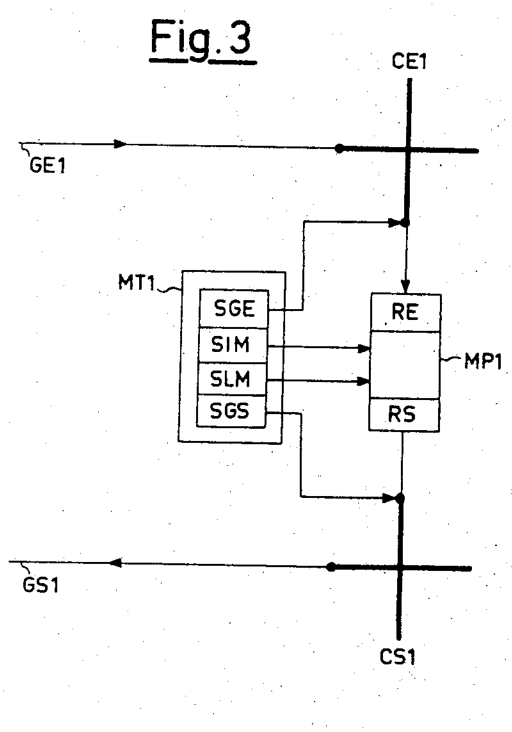
FIG. 3, the block diagram of the circuits of a switching network in which is applied the present invention.

Now will be described referring to FIG. 3, a switching network similar to that of FIG. 1, in which the present invention is applied. In FIG. 3, for clarity reasons, there have been represented only one incoming multiplex group, GE1, one outgoing multiplex group, GS1, the path store MT1, the speech store MP1 and the incoming and outgoing switches CE1 and CS1.

An input register RE and an output register RS related to store MP1 have been represented.

According to the invention, the path store MT1 is designed in the general form of four address sources: the incoming group address source SGE, the write address source SIM, the read address source SLM and the outgoing group address source SGS.

Figure 4:
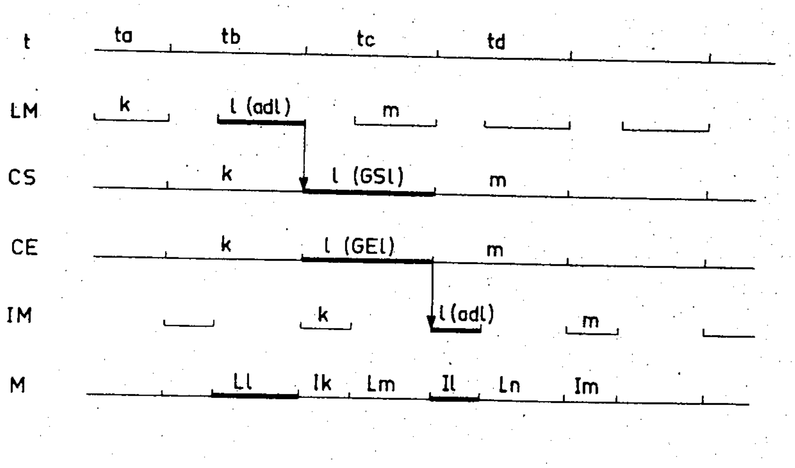
FIG. 4, a time diagram illustrating the operations carried out in the network of FIG. 3.

The operation of this network will be described referring simultaneously to FIG. 4 which represents the operating diagram of the various elements of FIG. 3. In FIG. 4 diagram, the line *t* delimits in time, channel time slots *ta*, *tb*, *tc*, *td*, etc. The line LM represents the read operations in store MP1, the line CS represents the orientation taken by the outgoing switch CS1, the line CE represents the orientation taken by the incoming switch CE1, the line IM represents the write operations in store MP1. These operations concern each time a line in communication, that is a time channel in an incoming and outgoing group, as well as a cell in store MP1. The concerned lines are designated by references *k*, *l*, *m*, *n*, etc. Finally, the line M represents the continuous sequence of the read and write operations in store MP1.

It is to be recalled that, at each channel time slot, for a particular call, a transfer must be performed between the contents of a memory cell, which is transmitted on an outgoing group, and the coded combination present on an incoming group, which must be recorded in the considered memory cell.

In FIG. 4, there has been represented in thick line, under the reference *l* the operations concerning a line in communication to which correspond simultaneous channel time slots *tc* on the concerned incoming and outgoing groups, for example groups GE1 and GS1, as well as a memory cell *ad*0.

As represented in FIG. 4, at the channel time slot *tb* preceding immediately the channel time slot *tc* of the considered line *l*, a read operation takes place in store MP1. To this end, the address source SLM supplies store MP1 with the address *ad* 1 of the concerned memory cell and the coded combination recorded in this cell is read out, in order to be transferred into register RS. This transfer operation takes place exactly at the end of channel time slot *tb*, for example by strobing of the read result. The item of information read out is then displayed by register RS at the beginning of the channel time slot *tc*.

Then, at channel time slot *tc*, the switches CE1 and CS1 are orientated onto the incoming and outgoing groups concerned by the considered call, that is onto groups GE l GS l, in response to the addresses supplied by the address sources SGE and SGS.

Therefore, register RS of store MP1 is connected to the group GSl and the just read-out coded combination is transmitted on this group GSl at the appropriate channel time slot. Simultaneously, the incoming group GEl presents a coded combination originated from the same line. As switch CE1 is oriented onto this group GEl, the coded combination is transmitted towards the input register RE of store MP1. The transmission lasts for all the channel time slot *tc* and ends by the writing of the incoming coded combination into register RE (strobing).

At the beginning of the channel time slot *td*, which follows immediately the channel time slot *tc* of the considered line, it can be seen that a write operation is carried out in store MP1. To this end, the write address source SIM supplies store MP1 with the address of the appropriate cell, that is the same address *ad*l which has served to the read operation at the channel time slot *tb*. The coded combination originated from group GEl and which has reached register RE at the end of the channel time slot *tc* is now recorded in the considered memory cell.

FIG. 4 also represents operations relative to a line *k* (time channel *tb*) and those concerning a line *m* (time channel *td*). It can be easily seen that these operations take place exactly in the same way as those just described, with a shift of one channel time slot forward and backward.

As it can be seen, by adopting an interleaving technique, although the operations concerning each line extend through three channel time slots, one line is processed per channel time slot.

FIGS. 5 to 8 illustrate this interleaving process and represent the orientation given to each network unit in the course of the operation concerning line l.

Figure 5:
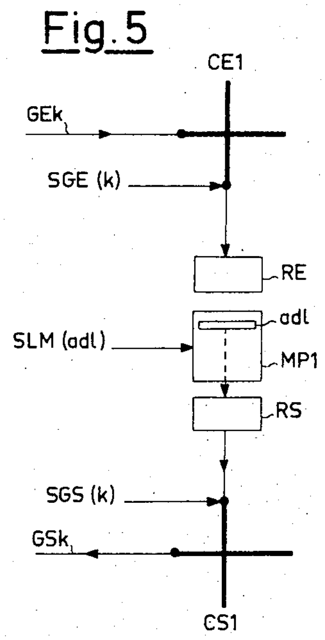
FIGS. 5 to 8, partial diagrams illustrating the operations carried out in the network of FIG. 3 and, FIG. 9 an alternative of the address sources of FIG. 3.

FIG. 5 represents the orientations at the end of channel time slot *tb:* switches CE1 and CS1 oriented onto groups GEk and GSk of line *k*, whereas store MP1 reads out the address *ad*l for line *l*.

Figure 6:
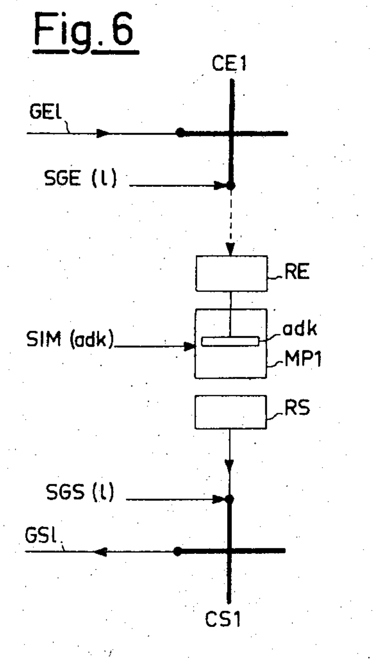

FIG. 6 represents the orientations at the beginning of channel time slot *tc:* switches oriented onto groups GEl and GSl of line l, whereas store MP1 writes at the address *adk* the combination originated from line *k*.

Figure 7:
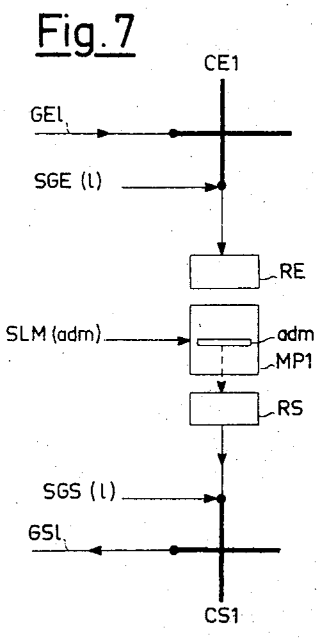
Figure 8:
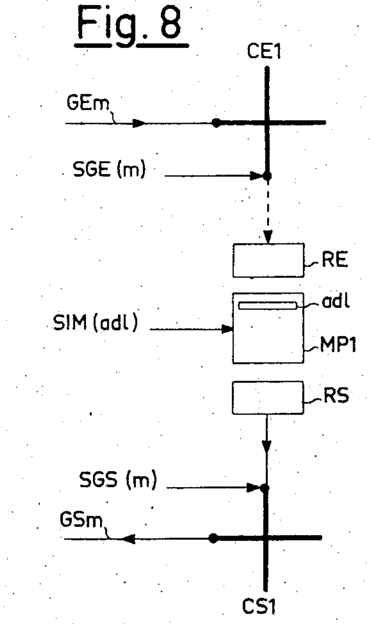

FIGS. 7 and 8 represent in the same way the orientations at the end of channel time slot *tc* and at the beginning of channel time slot *td*, according to FIG. 4 diagram.

Finally, returning to line C5 of FIG. 4, it can be seen that the switch CS1 is oriented onto a designated outgoing group during each channel time slot duration, which allows the coded combination transmission in the best time conditions. It is the same for switch CE1.

Referring to line M on which are indicated the read operations *Ll*, *Lm*, etc., and the write operations *Ik*, *Il*, etc., it can be seen that store MP1 has the totality of a channel time slot for carrying out, a write and read operation. The relative duration of these two operations depends upon the utilized technology; it is merely necessary that both operations be achieved within the time interval corresponding to a channel time slot.

The invention thus allots to each switching network unit the totality of the time assigned by the adopted switching principles.

Figure 9:
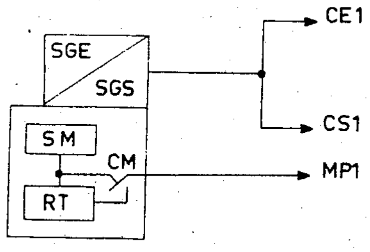

Considering now the requirements resulting from the operation illustrated by FIG. 4 as concerns the address sources, it appears that, with respect to call 1, the switches CE1 and CS1 are oriented at the same time onto groups GEl and GSl. Both groups may then bear the same address. Under these conditions, one single address source is sufficient, common to the incoming and outgoing groups. This is illustrated by FIG. 9, in which is represented a source SGE/SGS supplying addresses to switches CE1 and CS1 in parallel.

In connection with this, it is to be noted that the address sources SLM and SIM must supply identical addresses at a little more than one channel time slot interval. It is thus also possible, in this case, to have one common source, especially as these addresses are all intended for store MP1. This source will include an address generator SM directly supplying the read address, each time a switch CM is in rest condition, as represented in the figure. These addresses are simultaneously transmitted through a delay device RT and supplied to store MP1 each time the switch CM is operated. Store MP1 will thus receive the read and write addresses in the appropriate order, from a same address generator, in an economical way.

It is obvious that the preceding descriptions have only been given as an unrestrictive example and that numerous alternatives may be considered without departing from the scope of the invention. The numerical precisions, in particular, have only been given in order to facilitate the understanding of the invention and may vary with each application.

We claim:

1. A coded signal switching network comprising incoming multiplex groups constituted by time channels to which are assigned recurrent channel time slots, similar outgoing multiplex groups, at least one speech store constituted by addressable memory cells each provided for recording at least one coded signal combination, an incoming switch enabling the selective connection of the speech store to one of the incoming groups, an outgoing switch enabling the selective connection of the speech store to one of the outgoing groups, a read address source, an outgoing group address source, an incoming group address source and a write address source, characterized in that the synchronism between the different address sources is such that: in the course of a first channel time slot, the read address source supplies the store with the address of the memory cell to be read and the read operation takes place; in the course of a second channel time slot, subsequent to the first one, the outgoing group address source supplies the outgoing switch with the address of the concerned outgoing group and the coded combination read-out is transmitted on the outgoing group; in the course of a third channel time slot, the incoming group address source supplies the incoming switch with the address of the concerned incoming group; in the course of a fourth channel time slot, subsequent both to the first and the third ones, the write address source supplies the store with the address of the memory cell previously read-out and the coded combination originated from the incoming group is stored in said cell; whereby it is possible to use efficiently the switches and the store.

2. A switching network, according to claim 1, in which each address source is provided for supplying one address at each channel time slot and the operations described with respect to a particular call are repeated at the next channel time slot for another call, which enables, by interleaving, the processing of one line in communication per channel time slot.

3. A coded signal switching network, according to claim 1, in which said second and third channel time slots occur simultaneously.

4. A coded signal switching network, according to claim 1, wherein the coded signals assigned to the same lines bear the same address, and are characterized in that said outgoing group address source and said incoming group address source are one and the same group address source controlling in parallel the incoming and outgoing group switches.

5. A switching network, according to claim 1, characterized in that a common memory cell address source supplies directly the read addresses, and is thus used as a read address source, and supplies said same addresses, through delay means, for then acting as a write address source.

* * * * *